Oct. 2, 1951  H. G. TATOSIAN  2,569,545
ENDLESS BAND BLADE BREAD SLICER
Original Filed May 1, 1947  6 Sheets-Sheet 1

Inventor
Harry G. Tatosian

Oct. 2, 1951 H. G. TATOSIAN 2,569,545
ENDLESS BAND BLADE BREAD SLICER
Original Filed May 1, 1947 6 Sheets-Sheet 4

Fig. 5.

Inventor
Harry G. Tatosian
Richard J. Cowling
Attorney

Patented Oct. 2, 1951

2,569,545

UNITED STATES PATENT OFFICE 2,569,545

ENDLESS BAND BLADE BREAD SLICER

Harry G. Tatosian, Bronx, N. Y., assignor to King Kone Corporation, New York, N. Y., a corporation of New York Original application May 1, 1947, Serial No. 745,132. Divided and this application January 18, 1949, Serial No. 71,446

5 Claims. (Cl. 146—88)

This application is a division of my co-pending application Serial No. 745,132, filed May 1, 1947 which became Patent No. 2,514,977, July 11, 1950.

The present invention relates to improvements in toasting machines, and it has particular relation to an automatic toasting machine designed especially for the manufacture in commercial quantities of Melba toast.

An object of the invention is to provide a machine of a simple, durable and inexpensive construction capable of toasting under pressure large quantities of bread slices for making Melba toast in an efficient, economical and sanitary manner.

Another object of the invention is the provision of suitable means for automatically slicing a plurality of spaced bread loaves positioned within a magazine in an efficient and sanitary manner.

A further object of the invention is to provide suitable means for automatically positioning the individual bread slices on the toasting platens in a neat and orderly spaced arrangement.

Another object of the invention is the provision of means for driving the upper conveyor platens through suitable driving connection with the lower conveyor platens, thereby providing synchronization of the two conveyors in a simple, efficient and economical manner.

Various other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, wherein like numerals indicate like parts, in which.

Figures 1, 15:
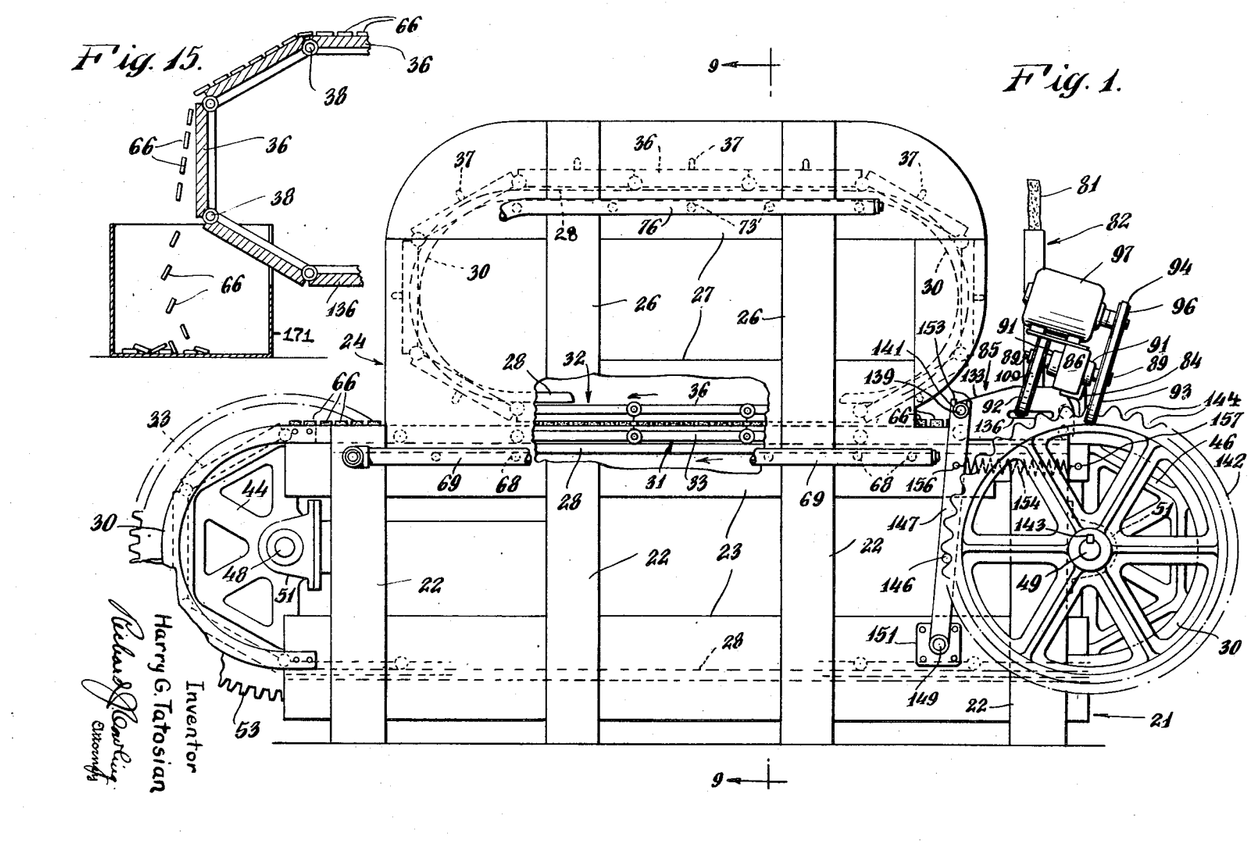
Figure 1 is a side elevational view, with parts in section, of an automatic toasting machine constructed in accordance with the principles of the invention, showing the bread magazine in its forward position at the beginning of its bread slicing stroke.
Figure 15 is a diagrammatic view showing the discharge of the finished toasted pieces from the lower conveyor platens into a suitable container.

Referring now to the drawings, and particularly to Figure 1, there is shown a relatively long lower rectangular box-like frame structure 21, having a plurality of spaced uprights or legs 22 suitably connected longitudinally intermediate their ends with a plurality of longitudinally extending and vertically spaced side plates 23. Mounted on the lower rectangular box-like structure 21 intermediate its ends is a relatively short upper rectangular box-like structure 24, having a plurality of spaced uprights or legs 26 formed integrally with the intermediate legs 22 of the lower frame structure 21, and connected by a plurality of longitudinally extending and vertically spaced side plates 27. The plates 23 and 27 are welded, bolted or otherwise securely attached to their respective legs 22 and 26. Each of the side plates 23 and 27 is provided intermediate its inner side with a longitudinally extending horizontal track 28, and the opposing tracks on opposite sides of the frame structures 21 and 24 provide suitable horizontal guideways or trackways. The horizontal trackways 28 in both the upper and lower supporting structures 21 and 24 are connected at their opposite ends by looped end sections 30. The trackways 28 with their respective looped end sections 30 provide upper and lower endless trackways for supporting endless horizontal conveyors 31 and 32 adapted to have their inner sections operating in juxtaposition. It will be noted that a large central section of the lower horizontal trackway 28 of the upper conveyor 36 is missing, as best shown in Figure 1, for reasons to be hereinafter described.

Figures 2, 3:
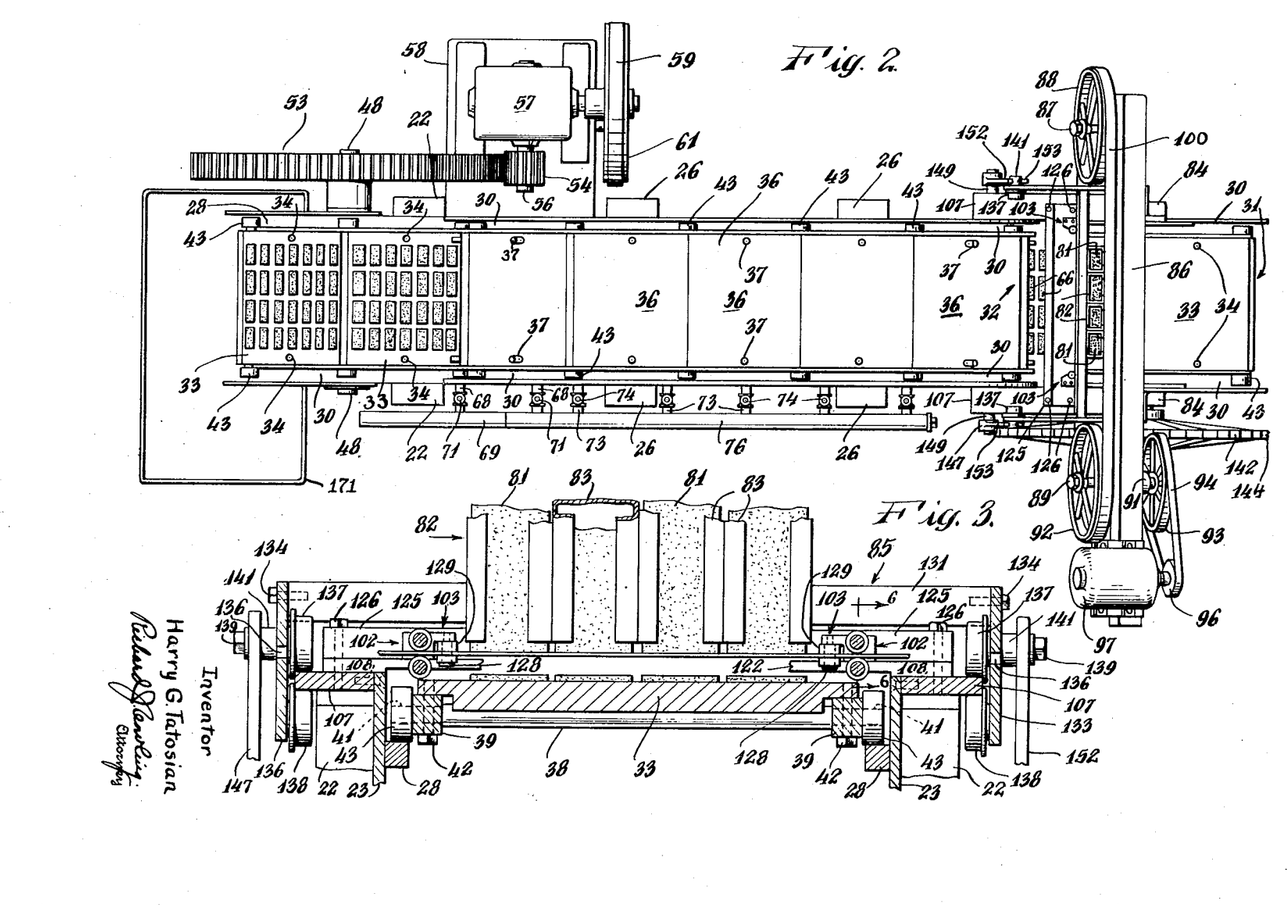
Figure 2 is a top plan view of the machine shown in Figure 1.
Figure 3 is an enlarged fragmentary cross-sectional view, with parts in elevation, and showing the mounting for the reciprocating bread slicing carriage, the bread magazine and the rotating cutting blade with its several spaced guiding means.

The lower conveyor 31 consists of a series of platens 33 connected pivotally end to end to form an endless circular chain of platens. Each of the platens 33 of the lower conveyor 31 is provided with a pair of transversely spaced apertures or recesses 34, as best shown in Figure 2. The upper conveyor 32 also consists of a series of platens 36, which are likewise connected pivotally end to end to form a second endless chain of platens. Each of the platens 36 of the upper conveyor is provided with a pair of spaced outwardly projecting driving studs 37, corresponding in size and shape to the recesses 34 of the platens 33 of the lower conveyor 31 with which they are intended to engage in a driving arrangement.

The opposite ends of each of the adjacent platens 33 and 36 of each of the conveyors 31 and 32 are mounted on a single transversely extending axle 38, which projects through an axle bar 39, which extends along opposite sides of each of the platens 33 and 36. The axle bars 39 are securely removably to the undersides thereof by the bolts 42 (see Fig. 3). The outer free ends or journals 41 of each of the axles 38 have a roller 43 journalled thereon, which roller 43 is adapted to operate over the endless trackways of their respective conveyors (see Fig. 4).

The driving mechanism for the lower conveyor 31 (see Figs. 4 and 9) consists of longitudinally spaced pairs of transversely spaced star wheels 44 and 44-a and 46 and 46-a mounted fixedly on spaced transversely extending shafts 48 and 49, respectively. The ends of the shafts 48 and 49 are journalled in bearing blocks 51 secured by bolts 52 to the lower frame structure 21. The end of the shaft 48 on which the star wheels 44 and 44-a (see Fig. 9) are keyed projects outwardly of the lower frame structure 21 on the side adjacent the star wheel 44-a (see Fig. 2) and has a large gear wheel 53 mounted fixedly on the projecting end thereof. The gear wheel 53 is, in turn, driven by a relatively small pinion gear 54 keyed to a stud shaft 56 of a conventional reduction gear box 57 mounted on a suitable supporting platform 58, which is secured to the lower frame structure 21. The reduction gear box 57 is, in turn, driven by means of a belt 59 connecting its driven wheel 61 with a conventional electric motor 62 (see Fig. 9), which is also suitably mounted to the lower frame structure 21. Each of the star wheels 44 and 44-a are provided at each of their corners with grooves or notches 63 for engaging the axle bars 38 of the lower platens 33 for driving the lower conveyor along its circular trackway 28 and 30.

The star wheels 46 and 46-a, which are mounted on the opposite end of the lower frame structure 21 are, in turn, driven by the axle bars 38 of the platens 33 engaging their corresponding notches 64 as said axle bars are moved along their respective trackway 28. The star wheels 46 and 46-a are keyed to their shaft 49 by means of a key 47 (see Fig. 5), and consequently cause the shaft 49 to rotate with them. The shaft 49 has a large cam wheel keyed thereto (see Figs. 2 and 4) for reasons to be hereinafter described in greater detail.

It will be apparent that no separate driving mechanism is required for operating the upper conveyor 32, but, when the apparatus is assembled, the projecting lugs 37 of the upper plates 36 which are in juxtaposition with certain of the lower platens 33 of the lower conveyor 31 will be mounted in engagement with the recesses 34 thereof. In this arrangement, the movement of the lower conveyor 31 will be imparted to the upper conveyor 32, and the projecting lugs 37 of succeeding platens 36 will engage the recesses 34 of succeeding platens 33, causing synchronous movement of the two conveyors 31 and 32 whenever the lower conveyor 31 is being operated. Since a large section of the trackways 28 of the lower level of the upper conveyor 32 is missing (see Fig. 1), it will be obvious that the platens 36 of the upper conveyor 32 at such point will have a tendency to sag or drop down and rest on the platens 33 of the lower conveyor 31. When bread slices 66 are mounted on the platens 33 of the lower conveyor 31, they will have a tendency to support the sagging weight of the platens 33 of the upper conveyor 32 (as best shown in Fig. 5), and will be under the pressure of their weight during the toasting period along that portion of its travel which is devoid of supporting trackway.

Figures 4, 6, 7, 8:
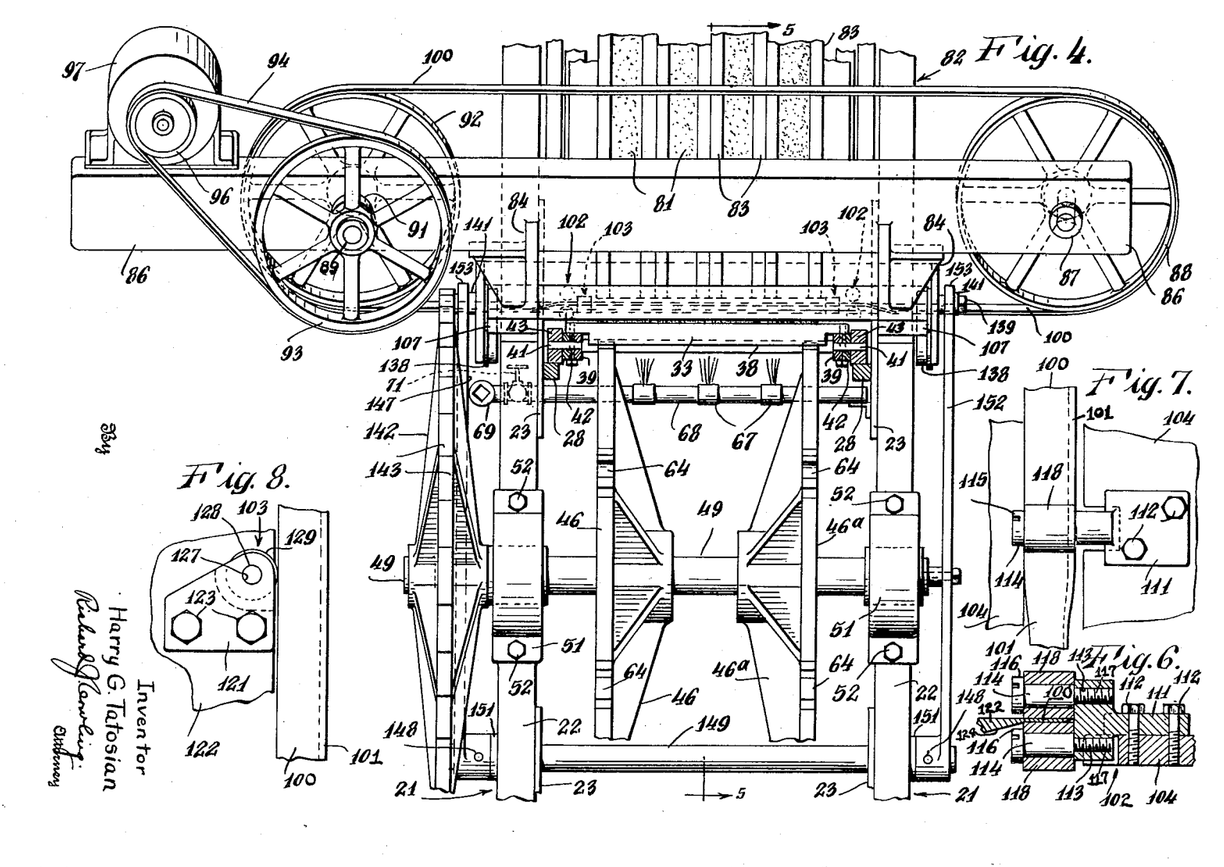
Figure 4 is an enlarged fragmentary front elevational view of the machine shown in Figure 1, with several of the lower conveyor platens removed for the sake of clearness in illustrating the internal driving mechanism therefor.
Figure 6 is an enlarged fragmentary sectional view of the cutting blade and one of its horizontal holders, the same having been taken substantially along the line 6—6 of Figure 3, looking in the direction of the arrows.
Figure 7 is a fragmentary top plan view of the cutting blade and the holders shown in Figure 6, illustrating further details regarding the mounting of said rollers.
Figure 8 is a top plan view of one of the vertical guide rollers which engages the back edge of the rotating cutting blade for holding it in a transverse plane with respect to the bread magazine.

The platens 33 and 36 of the conveyors 31 and 32 may be heated in any suitable manner sufficient to toast the bread slices 66 wedged therebetween. One method of heating the platens 33 of the lower conveyor 31 is shown in Fig. 4, and consists of a series of longitudinally spaced and transversely extending gas burners 67 mounted between the opposite sides of the lower frame structure 21 immediately below the underside of its top row of platens 33 thereof. Each gas burner consists of a perforated pipe coupling 67 mounted on a supporting pipe 68 to provide a series of transversely spaced gas jets. Each pipe 68 is, in turn, connected adjacent the outer side of the frame structure to a main high pressure gas line 69 extending longitudinally along the outer side thereof. Each burner pipe 68 is provided with a manually operable valve 71 for controlling the flow of gas thereto. The burners 67 may be lit in any conventional manner, and, by means of the valves 71, it is possible to vary the heat of the platens 33 by controlling the number of burners in operation or by controlling the size of the flame of each burner. The platens 36 of the upper conveyor are similarly heated (see Fig. 5) by an independent series of longitudinally spaced and transversely extending gas burners 72 positioned immediately below the underside of the upper level of platens 36. Each burner 72 consists of a perforated coupling mounted on a supporting pipe 73. The pipe 73 is provided with a manually operable control valve 74, and is connected beyond the valve 74 to a main high pressure gas line 76 extending longitudinally along one side of the upper supporting structure 24 (see Fig. 9).

Figure 5:
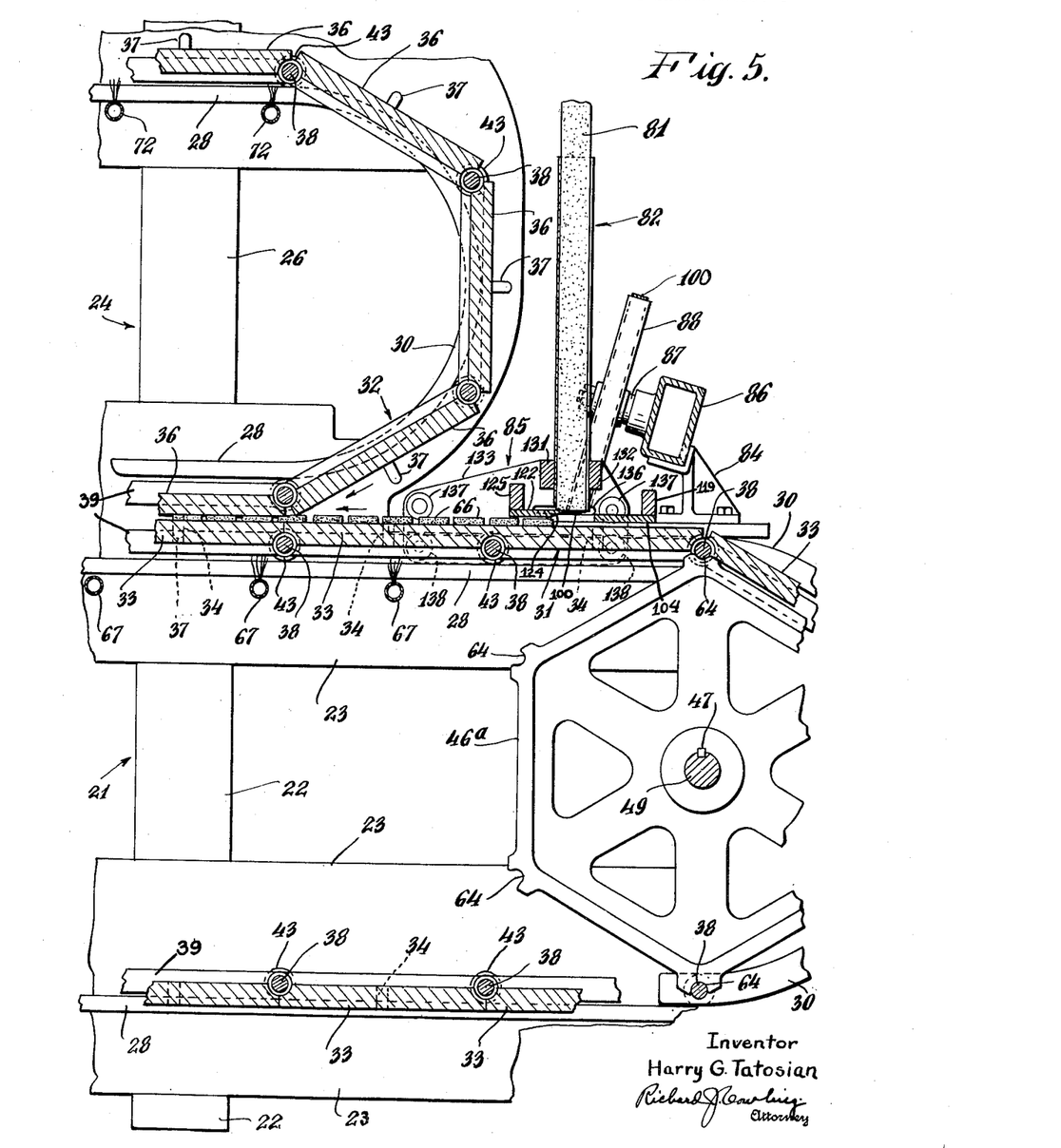
Figure 5 is an enlarged fragmentary longitudinal sectional view of the end of the machine shown in Figure 4, the same having been taken substantially along the line 5—5 thereof, looking in the direction of the arrows.

Referring now to Figure 5, there is shown the mechanism for simultaneously cutting or slicing a plurality of bread loaves 81, which are confined in a suitable bread magazine 82, which is mounted transversely of the lower frame structure 21 above and adjacent the forward end of the lower conveyor 31, and immediately in front of said bread magazine. The bread magazine 82 consists of a plurality of tubular members 83, providing a series of transversely spaced pockets, each adapted to receive a plurality of bread loaves 81 stacked vertically therein, each pocket having a cross-sectional shape substantially the size and shape of the bread loaves 81.

The cutting or slicing mechanism consists of a pair of transversely spaced angle iron supporting brackets 84 mounted in any suitable manner on opposite sides of the frame structure 21. A tubular bar 86 is mounted by welding or other suitable means on the brackets 84, and projects outwardly on opposite sides of the frame structure 21, as best shown in Fig. 4. The bar 86 has a fixed stud shaft 87 mounted adjacent one end thereof, which projects inwardly of the apparatus, and is adapted to support an idler pulley wheel 88. The opposite end of the bar 86 has a suitable shaft 89 extending transversely therethrough and projecting outwardly on opposite sides thereof. The shaft 89, which is journalled in suitable bearing blocks 91 (see Fig. 1), has a driving pulley wheel 92 keyed to its inner end, which is identical in size and shape to the idler pulley wheel 88. The opposite end of the shaft 89, which projects away from the apparatus, has a driving pulley 93 keyed thereto, which, in turn, is connected by a belt 94 to a driving pulley 96 of a conventional electric motor 97 connected to a source of electric power (not shown). An endless band cutting blade 100 is mounted between the two transversely spaced pulley wheels 88 and 93, and is driven by its frictional engagement with the driving pulley wheel 93. It will be readily apparent that the cutting blade 100 is adapted to be driven continuously and independently of the movement of the conveyors 31 and 32. It will also be noted that the blade 100 has the lower side of its cutting edge ground to a sharply tapered point 101, as best shown in Figs. 10 to 19, to provide a relatively sharp knife cutting edge that reduces materially the waste in slicing the bread loaves 81 into relatively thin bread slices 66.

The rapidly revolving endless cutting blade 100 must obviously be held in a fixed horizontal plane extending tranversely adjacent the front and bottom of the reciprocating bread magazine 82 if the bread slices 66 are to be cut uniformly. The relative positions of the several cutting blade holding means are best shown in Fig. 3, and consist of spaced pairs of identical horizontal roller guide members 102, and spaced identical vertical roller guide members 103 mounted, as hereinafter described, on a transversely extending bed plate 104 bolted at opposite ends to a rail of a longitudinally extending trackway 107 mounted on one of the side plates 23 by bolts 108.

Referring now to Figures 6 and 7, each roller guide member 102 consists of a T-shaped bracket 111, secured by bolts 112 to the bed plate 104, and provided with vertically spaced horizontally extending internally threaded apertures 113 therethrough. Tap bolts 114, having slotted heads, as indicated at 116, and threaded end shanks 117 are adapted to be mounted threadingly in each of the apertures 113, providing suitable journals for rotatably mounting the guide rollers 118. The horizontal guide rollers 118 are spaced vertically a distance sufficient to permit the rotating endless cutting blade 100 to pass therebetween. The bed plate 104 has an upwardingly extending bar mounted fixedly in any suitable manner adjacent its outer edge to provide a flange, as indicated at 119.

The mounting for the vertical roller guide members 103 is shown in detail in Figure 8, and consists of a bracket 121 mounted adjacent each end of a bed plate 122 by means of suitable bolts 123. The bed plate 122 has its lower inner edge tapered, as indicated at 124 (see Fig. 10), and has an upstanding flange bar 125 secured along its opposite edge. The bed plate 122 is mounted between the trackways 107 by means of suitable bolts 126. The bracket 121 has a vertically extending internally threaded aperture 127 adapted to receive a tap bolt 128, providing a suitable journal mounting for the vertically extending guide roller 129 to revolve thereon. It will be noted that the guide roller 129, which is free to revolve on the bolt 128, is mounted so that its circumferential edge projects a slight distance beyond the tapered edge 124 of the bed plate 122, and is adapted to engage frictionally the rear edge of the endless cutting blade 100, keeping it in a transversely extending plane as it passes in front of the bread magazine 82.

Referring now to Figures 1, 3, 5 and 10 to 14, there is shown in detail the features of the reciprocating bread magazine 82, which is adapted to reciprocate longitudinally of the forward end of the lower conveyor 31 on its trackway 107. The bread magazine 82 is mounted on a reciprocating bread magazine carriage 85, consisting of a pair of transversely extending spaced cross-bars 131 and 132 (see Fig. 5), which support the same in a vertical position above the front end of the lower supporting structure 21 and immediately in front of the cutting blade 100. The cross-bars 131 and 132, extending laterally of the supporting structure 21, carry end plates 133 secured by bolts 134. Each of the end plates 133 is provided with an elongated horizontally extending aperture 136 to permit the endless cutting blade 100 to operate therethrough. Of course, it is understood that the ends of the cutting blade 100 are not secured to form an endless band until they have been threaded through the slots 136 of the end plates 133. A pair of vertically spaced flanged rollers 137 and 138 are mounted rotatably on the inner side of each of the end plates 133, and are adapted to engage opposite sides of the horizontal trackway 107. The axle for each of the upper rollers 137 projects through the end plates 133, providing an outwardly projecting stud 139 adapted to have a roller member 141 journalled thereon.

The means for reciprocating the bread magazine carriage 85 is mounted on a projecting end of the shaft 49, which passes through the star wheel 46 and extends outwardly of the frame structure 21. This means consists of a cam wheel 142 keyed thereto by a key 143, as best shown in Figure 1. The cam wheel 142 is provided with a continuous series of cam conformations 144 along its circumferential edge, which are adapted to be engaged by a cam stud 146 mounted intermediate the ends of a cam lever 147. The cam lever 147 has its lower end mounted fixedly by a pin 148 to one end of a transversely extending shaft 149 journalled in suitable bearing blocks 151. A second cam lever 152 is correspondingly mounted fixedly by a pin 148 to the opposite end of the shaft 149, projecting outwardly of the lower frame structure 21. Each of the cam levers 147 and 152 have their upper ends bifurcated, and their respective bifurcations 153 are adapted to engage the adjacent roller member 141 projecting outwardly from the end plates 133 of the bread magazine carriage 85.

Figures 9, 10, 11, 12, 13, 14:
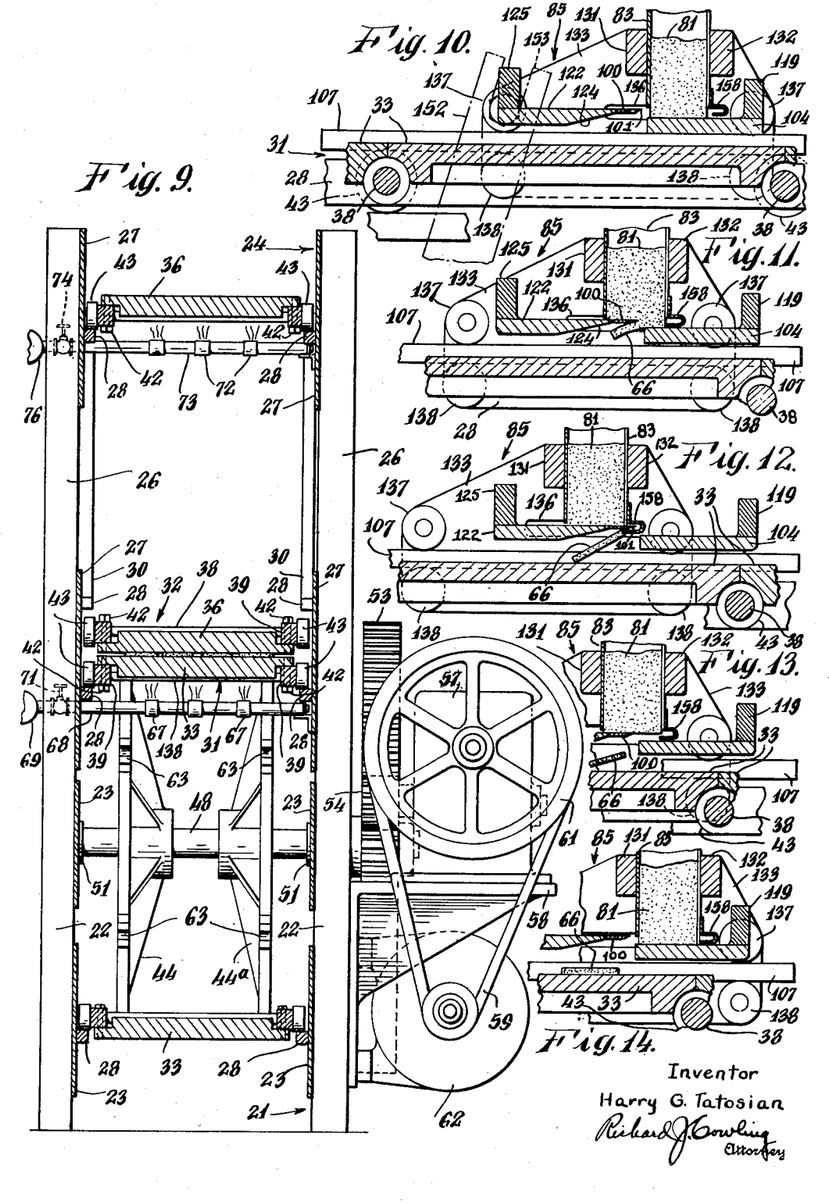
Figure 9 is a cross-sectional view of the apparatus shown in Figure 1, the same having been taken substantially along the line 9—9 thereof, looking in the direction of the arrows.
Figure 10 is an enlarged fragmentary diagrammatic view illustrating the normal relative position of the bread magazine and its revolving cutting blade just prior to the start of the bread slicing stroke, which position is best shown in Figure 2.
Figure 11 is another diagrammatic view of that portion of the machine shown in Figure 10, the same illustrating the relative position of the several parts at substantially the middle of one of its bread slicing strokes.
Figure 12 is a further diagrammatic view of the several parts shown in Figure 10, the same showing the relative position of the various parts at the end of one of the bread slicing strokes.
Figure 13 is still another diagrammatic view of the several parts shown in Figure 10, illustrating the relative position of the parts shortly after completion of one of its bread slicing strokes and when the bread carriage has been returned approximately halfway on its return stroke.
Figure 14 is a further diagrammatic view of the bread slicing mechanism with its several parts returned to their normal position, as shown in Figure 10, and illustrating the position of the last cut row of bread slices on the toasting platen of the lower conveyor.
Figure 16:
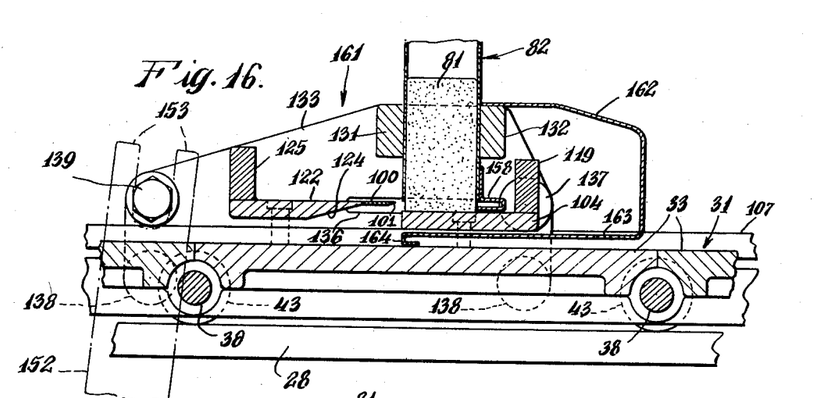
Figure 16 is an enlarged fragmentary diagrammatic view of a modified form of bread carriage, showing the normal relative position of the cutting blade and the bread magazine at the start of the bread slicing stroke, the latter having a rearwardly extending arm for receiving the bread slices as they are cut from the bread loaves, and means for pushing them off said arm in transversely extending and longitudinally spaced rows onto the lower conveyor platens.
Figure 17:
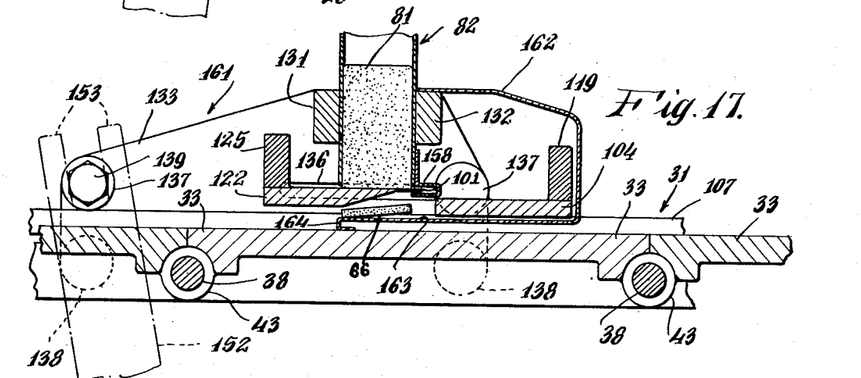
Figure 17 is a fragmentary diagrammatic view of the bread carriage and cutting blade shown in Figure 16, the same being shown at the end of its bread slicing stroke, with the cut bread slices dropping onto the receiving arm of the reciprocating bread carriage.
Figure 18:
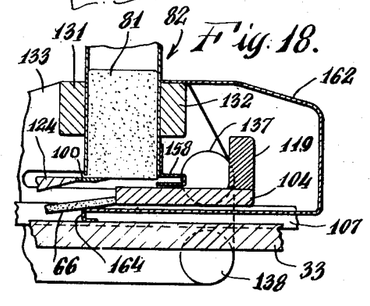
Figure 18 is a fragmentary diagrammatic view of the apparatus shown in Figure 16, illustrating the manner in which the row of cut bread slices is transferred from the receiving arm of the reciprocating bread carriage onto the platens of the lower conveyor.
Figure 19:
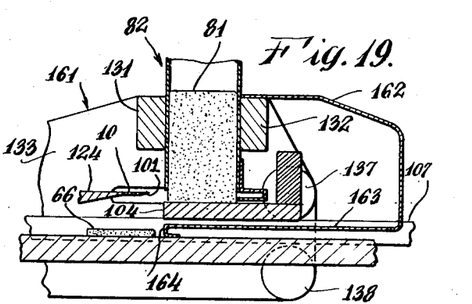
Figure 19 is another fragmentary view similar to Figure 18, in which the row of cut bread slices has been transferred to the lower conveyor platens and the various parts have been returned to their normal position, which is shown in Figure 16, ready to begin the next cutting stroke.
Figure 20:
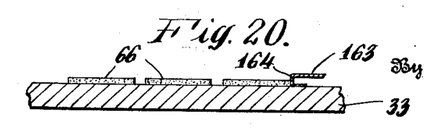
Figure 20 is a fragmentary sectional view showing the relative position of a plurality of rows of bread slices on a lower conveyor platen with the last row of slices being moved forwardly into transverse alignment on said platen by the forward end of the receiving arm of the reciprocating bread slicing mechanism.

A tension spring 154 (see Fig. 1), having one end connected to the cam lever 147 intermediate its cam stud 146 and bifurcations 153, as indicated at 156, and having its opposite end fastened securely to the frame structure 21, as indicated at 157, serves to urge the cam stud 146 tightly at all times against its cam wheel 142 and into its cam conformations 144. When the cam stud 146 is in the position shown in Figure 1, which is at the bottom of one of the cam conformations 144, the bread magazine carriage 85 is in a position in front of the cutting blade 100, which position is more clearly illustrated in Figure 10. As the cam stud 146 rides out of the cam conformation 144, the cam lever 147 is forced inwardly against the tension of the spring 154, drawing the bread magazine carriage 85 inwardly, forcing its confined bread loaves 81 into and through the cutting blade 100, as illustrated in Figure 11. The spring tensioning means 154 obviously tends to force the cam stud 146 tightly against the cam wheel 142, making certain that it is in operating engagement therewith at all times.

It will be apparent from the diagrammatic views shown in Figures 10 to 14, both inclusive, that the bread magazine 82, which is mounted between the transversely extending supporting bars 131 and 132, is positioned a short distance above the level of the bread supporting bed plate 104. The bread magazine 82 is provided with a U-shaped guard 158, which extends slightly below the bottom of the bread magazine 82. The guard 158 serves to hold the lower portion of the bread loaves 81, which is that portion about to be severed therefrom as a bread slice 66, against horizontal movement during the slicing operation. It will be noted that the bed plates 104 and 122 are in different horizontal planes, and that the bed plate 122 is positioned above the bed plate 104 a distance equal to the thickness of a cut bread slice 66. It will also be readily apparent from the diagrammatic illustrations of Figures 10 to 14, both inclusive, that the bed plate 104 serves to support the bread loaves 81 prior to the cutting of a bread slice 66, and that the bed plate 122 serves to support the bread loaves 81 after the bread slices 66 have been cut and until the bread carriage 85 returns to its normal position. The bread loaves 81 will be fed by gravity onto the lower bed plate 104 when the reciprocating bread magazine carriage 85 moves outwardly on its return stroke, as best shown in Figure 14.

Referring now to Figures 16 to 19, both inclusive, there is shown a modified form of bread magazine carriage 161, in which provision has been made for moving the cut bread slices 66 inwardly of the lower conveyor 31 and arranging them in a regular and orderly manner in longitudinally spaced rows extending transversely of the platens 33 thereof. In this modification, the final position of the cut bread slices 66 is not left to chance, but the bread magazine carriage 161 is provided with an encircling U-shaped arm 162, having a flat lower receiving platform 163, provided with a downwardly projecting pusher arm 164 adapted to glide over the platens 33 of the lower conveyor 31. In all other respects, the bread magazine carriage 161 is identical with the bread magazine carriage 85 and operates in a similar manner. In this modified construction, the bread slices 66, when cut from their respective bread loaves 81, drop onto the inner part of the receiving arm or platform 163. When the bread magazine carriage 161 is in its normal position (shown in Fig. 16), it is ready for cutting a plurality of bread slices. When the bread slices 66 are cut, they gravitate onto the receiving platform 163 (see Fig. 17). When the bread carriage 161 returns to its normal position, the cut bread slices 66 are engaged by the inner edge of the stationary bed plate 104, which causes them to be forced off the receiving platform 163 onto the top of the platen 33 of the lower conveyor 31 passing therebelow (see Fig. 18). On the next inwardly moving or cutting stroke of the bread magazine carriage 161 against the rapidly revolving cutting blade 100, the forward edge 164 of the receiving platform 163, as it is moved inwardly, will engage the bread slices 66 resting on the platens 33 and move them further inwardly and into an orderly transversely extending row. The bread slices 66 will be spaced longitudinally in rows transversely of the platens 33 since they are moving continuously, and will have moved forwardly a sufficient distance during the period of time that the bread carriage magazine 161 is reciprocating to form a space between each of said rows of bread slices.

In the operation of the apparatus shown in Figures 1 to 15, both inclusive, it will be assumed that the gas burners 67 have been lit and the conveyor platens 33 and 36 have been heated to the degree of heat necessary to toast the bread slices 66 positioned therebetween to the desired degree of brownness; that the two conveyors 31 and 32 are operating continuously and synchronously; that the bread magazine subdivisions 83 have been filled with loaves of bread 81; and that the bread cutting blade 100 is being driven in a continuous manner.

The continuous movement of the lower conveyor 31 causes the shaft 49 to be turned by movement of its keyed star wheels 46 and 46-a as the conveyor axle bars 38 engage their respective notches 64 in passing therearound. Turning of the shaft 49 will cause the keyed cam wheel 142 to be rotated with it, causing the cam stud 146 to ride in and out of the cam conformations 144 thereof, which will cause the levers 147 and 152 to reciprocate. The reciprocating cam levers 147 and 152, through their connections with the rollers 141 of the bread magazine carriage 85, reciprocate the latter, forcing the lower ends of the confined bread loaves 81 across the outer edge of the rapidly revolving cutting blade 100, causing a bread slice 66 to be cut from each of the bottom loaves in the bread magazine. The cut bread slices 66 will drop onto the platens 33 of the lower conveyor 31 passing therebelow. By the time the bread magazine carriage 85 is returned by the action of its bifurcated levers 146 and 152 being drawn inwardly by the spring urging means 154 to its normal position (see Fig. 10), the platens 33 of the lower conveyor 31 will have moved inwardly a distance sufficient to carry the last cut bread slices 66 out of the way of the next to be severed bread slices.

The cut bread slices 66 are a cross-sectional slice of the bread loaves 81, which are especially baked to the size and shape desired in the final Melba toast product 170. These bread slices 66 are cut to a thickness slightly larger than the desired thickness of the finished toasted bread 170, because they are compacted, under pressure of the upper platens 36, during the toasting operation. The toasted bread slices 170 after passing between the platens 33 and 36 of the conveyors 31 and 32 will remain on the platens 33 of the lower conveyor 31, and at its end gravitate into a receiving receptacle 171 (see Fig. 15), whereby they may be transported to a packaging operation (not shown). The pressure resulting from the weight of the upper platens 36 on the bread slices 66 compresses the cellular bread slice 66 and holds it under such compression during the entire toasting period so that no warpage can take place. While warpage of the toasted bread slice 170 would not render it unfit for sale or use, it does have several disadvantages which should be obviated. Warped toasted bread slices require greater packaging space per unit of weight; are much more fragile, resulting in considerable breakage in shipment, which is unsatisfactory to the average purchaser; and are hard to spread with butter or other edible spreads since they are quite brittle and have a tendency to break into numerous small pieces under the spreading pressure of a table knife, especially if the toasted slice is being held on a flat surface, such as a plate.

It will not be practical to establish a table of times and temperatures for making Melba toast in this manner since each bread formula produces a bread having an entirely different toasting characteristic. Some breads, especially the rye and brown breads, require more than twice as much toasting time as other breads to produce the same degree of brownness under the same toasting temperatures. Some people like their bread toasted to a very dark brown, just short of burnt, while others require a very light brown toast. Various markets have different ideas of what is desirable in the way of toasted bread slices, and all of these factors must be taken into consideration by the manufacturer. In the present apparatus, different types of toast may be produced in several ways, namely: by varying the speed of the driving motor 62 or reduction gearing 57 to cause the lower conveyor 31 to operate at a slower or faster speed; and by turning off some of the gas burners, or turning all of them down to permit only a small flame, each of which is controlled by means of a separate manual valve, to reduce the temperature of the conveyor platens between which the bread slices are to be toasted. No details are given for varying the speed of the motor 62 or the reduction gearing 57 since such devices are of a conventional construction and form no part of the present invention.

It will be readily apparent from the foregoing description that the machine will cut and toast the bread slices without requiring constant attention of an operator. The only need for an operator is to keep the several bread magazines filled at all times with bread loaves, but, if no bread loaf is positioned in any one or more of the bread magazines, it will not affect the operation of the machine, since it will continue to cut bread slices from such magazines as have bread loaves therein. In this manner, the production of the machine may be varied, but obviously such a method is not as efficient as those described hereinbefore.

Although I have shown and described in detail only two modifications of the invention, it will be readily understood by those skilled in the art that the same is not to be so limited, but that various other modifications may be made therein without departing from the spirit thereof or from the scope of the appended claims.

What I claim is:

1. A bread slicing mechanism comprising an operating conveyor, trackways mounted on opposite sides of said conveyor for supporting a bread magazine thereover, a bread magazine mounted on said trackways and adapted to be reciprocated thereover having a plurality of tubular pockets for receiving a plurality of bread loaves stacked end to end, a stationary platform mounted over said conveyor and below said magazine for supporting the lowermost loaf of bread in slicing position, a stationary receiving platform mounted in a different horizontal plane from the plane of said supporting means above said conveyor and below said magazine for receiving the lowermost loaf of bread after a slice has been cut therefrom, an endless band saw mounted adjacent the receiving edge of said receiving platform, pairs of spaced guide means at each side of the receiving platform for maintaining said band saw in alignment with the receiving edge thereof and means connected with said conveyor for intermittently reciprocating said magazine over said trackway whereby a slice is cut and deposited on said conveyor.

2. A bread slicing mechanism comprising an operating conveyor, trackways mounted on opposite sides of said conveyor over a short portion of its length for supporting a bread magazine thereover, a bread magazine mounted on said trackways and adapted to be reciprocated thereover having a plurality of tubular pockets for receiving a plurality of bread loaves stacked end to end, a stationary platform mounted over said conveyor and below said magazine for supporting the lowermost loaf of bread in each pocket in slicing position, a stationary receiving platform mounted in a different horizontal plane from the plane of said supporting means above said conveyor and below said magazine for receiving the lowermost loaf of bread in each pocket after a slice has been cut therefrom, an endless band saw mounted adjacent the receiving edge of said receiving platform, spaced pairs of vertically spaced rollers on each side of the receiving platform, rollers for supporting said cutting blade in a fixed horizontal plane adjacent the receiving edge thereof, means connected with the driving means of said conveyor for intermittently reciprocating said magazine over said trackway whereby a slice is cut and deposited on said receiving platform, and means connected with said magazine for discharging the bread slices therefrom onto said conveyor.

3. A bread slicing mechanism adapted to be mounted over a continuously operating conveyor, a pair of trackways mounted on opposite sides of said conveyor adapted to support a bread magazine in spaced relation thereabove, a reciprocating bread magazine mounted on said trackways having a plurality of open-ended tubular pockets for receiving a plurality of bread loaves stacked vertically end to end, a stationary supporting platform mounted over said conveyor and below said magazine across the back portion of said trackways for supporting the lowermost loaf of bread in each pocket in slicing position below said magazine, a stationary receiving platform mounted over said conveyor and below said magazine across the front portion of said trackways for receiving and supporting the lowermost loaf of bread of each pocket after a slice has been cut therefrom, said supporting and receiving platforms being spaced vertically and horizontally from each other, an endless saw adapted to operate continuously between said platforms, means for operating said cutting blade, vertically spaced horizontal rollers mounted on opposite sides of said receiving platform for maintaining said band saw in vertical alignment with the receiving edge thereof, spaced vertical rollers mounted on each side of the receiving platform for engaging the rear edge of said band saw to maintain the same in its transversely extending plane, and means connected with the driving means of said conveyor for intermittently reciprocating said magazine over said trackway whereby a slice is cut from the lowermost loaf of bread in each pocket.

4. A bread slicing mechanism adapted to be mounted over a continuously operating conveyor, a pair of trackways mounted on opposite sides of said conveyor along a portion of its length adapted to support a bread magazine in spaced relation thereabove, a reciprocating bread magazine mounted on said trackways having a plurality of open-ended tubular pockets for receiving a plurality of bread loaves stacked vertically end to end, a stationary supporting platform mounted over said conveyor and below said magazine across the back portion of said trackways for supporting the lowermost loaf of bread in each pocket in slicing position below said magazine, a stationary receiving platform mounted over said conveyor and below said magazine across the front portion of said trackways for receiving and supporting the lowermost loaf of bread of each pocket after a slice has been cut therefrom, said supporting and reciving platforms being spaced vertically and horizontally from each other, a cutting blade adapted to operate continuously between said platforms, means for operating said cutting blade, means associated with the driving means of said conveyor or for intermittently reciprocating said magazine over said trackway whereby a slice is cut from the lowermost loaf of bread in each pocket, and means carried by said magazine for receiving the cut bread slices, said means being operatively associated with said supporting means for discharging the bread slices therefrom onto said conveyor.

5. A bread slicing mechanism adapted to be mounted over a continuously operating conveyor, a pair of trackways mounted on opposite sides of said conveyor along a portion of its length adapted to support a bread magazine in spaced relation thereabove, a reciprocating bread magazine mounted on said trackways having a plurality of open-ended tubular pockets for receiving a plurality of bread loaves stacked vertically end to end, a stationary supporting platform mounted over said conveyor and below said magazine across the back portion of said trackways for supporting the lowermost loaf of bread in each pocket in slicing position below said magazine, a stationary receiving platform mounted over said conveyor and below said magazine across the front portion of said trackways for receiving and supporting the lowermost loaf of bread of each pocket after a slice has been cut therefrom, said supporting and receiving platforms being spaced vertically and horizontally from each other, a cutting blade adapted to operate continuously between said platforms, means for operating said cutting blade, means associated with the driving means of said conveyor for intermittently reciprocating said magazine over said trackway whereby a slice is cut from the lowermost loaf of bread in each pocket, means carried by said magazine for receiving the cut bread slices, said means being operatively associated with said supporting means for discharging the bread slices therefrom onto said conveyor, and means carried by said slice receiving means aligning and moving the discharged bread slice forwardly on said conveyor on the next cutting stroke.

HARRY G. TATOSIAN.

REFERENCES CITED

The following references are of record in the file of this patent:

UNITED STATES PATENTS

| Number | Name | Date |
|---|---|---|
| Re. 15,809 | Bartini | Apr. 1, 1924 |
| 1,663,543 | Buck | Mar. 27, 1928 |
| 1,683,445 | Brock | Sept. 4, 1928 |
| 1,824,913 | Milligan | Sept. 29, 1931 |
| 1,962,847 | Streckfuss | June 12, 1934 |
| 2,430,504 | Grills | Nov. 11, 1947 |

FOREIGN PATENTS

| Number | Country | Date |
|---|---|---|
| 441,634 | Germany | Mar. 5, 1927 |
| 440,730 | Great Britain | Dec. 27, 1935 |